United States Patent

Wilson

[15] 3,649,812

[45] Mar. 14, 1972

[54] BARBECUE OVEN WITH A DISPLACEABLE PANEL

[72] Inventor: Robert G. Wilson, 165 Faris Circle, Greenville, S.C. 29605

[22] Filed: Apr. 26, 1971

[21] Appl. No.: 137,226

[52] U.S. Cl.....................219/396, 99/421 HV, 99/443 R, 219/388, 219/410
[51] Int. Cl.............................................F27d 11/02
[58] Field of Search................219/388, 395, 396, 400, 405, 219/410, 411; 99/421 HV, 443 R, 443 C, 346

[56] References Cited

UNITED STATES PATENTS

| | | | |
|---|---|---|---|
| 3,214,566 | 10/1965 | Wilson | 219/400 |
| 3,273,489 | 9/1966 | Wilson | 99/421 HV |
| 3,295,434 | 1/1967 | Wilhelm et al. | 99/346 |
| 3,333,529 | 8/1967 | Wilson | 99/443 R X |
| 3,355,573 | 11/1967 | Wilson | 219/396 |
| 3,403,243 | 9/1968 | Martz et al. | 219/411 |
| 3,585,360 | 9/1969 | Young et al. | 219/405 |

Primary Examiner—Volodymyr Y. Mayewsky
Attorney—Bailey & Dority

[57] ABSTRACT

A barbecue oven having a housing enclosing a rotatable supporting assembly and a first electrode heating means. A recess in a vertical wall of the housing and containing second electric heating means for emitting heat into the oven while protecting the same from drippings. A panel attached to the vertical wall closing the recess and accommodating the second heating means, said panel being vertically displaceable to facilitate cleaning of said panel and the adjacent inner areas of the housing.

3 Claims, 2 Drawing Figures

PATENTED MAR 14 1972

3,649,812

INVENTOR.
ROBERT G. WILSON
BY Bailey & Dority
ATTORNEYS.

BARBECUE OVEN WITH A DISPLACEABLE PANEL

This invention relates to a barbecue oven and the like having a panel which may be displaced from its vertical position for access to clean the inner surface thereof, as well as adjacent inner areas of the oven.

Barbecue ovens have been provided wherein auxiliary heating elements have been positioned in recesses in lower portions of the oven, such as illustrated in U.S. Pat. No. 3,355,573, issued Nov. 28, 1967. Such constructions have been instrumental in improving the cooking qualities of barbecue ovens, while at the same time avoiding contamination of the auxiliary heating elements by drippings from the edibles being cooked. It has been difficult, however, to clean the lower interior portions of the oven, as well as the recessed portions adjacent the auxiliary heating elements.

Accordingly, it is an important object of this invention to provide a displaceable panel accommodating the recess so as to facilitate cleaning of the recessed areas, as well as the lower portions of the oven.

The construction designed to carry out the invention will be hereinafter described, together with other features thereof.

Figure 1:
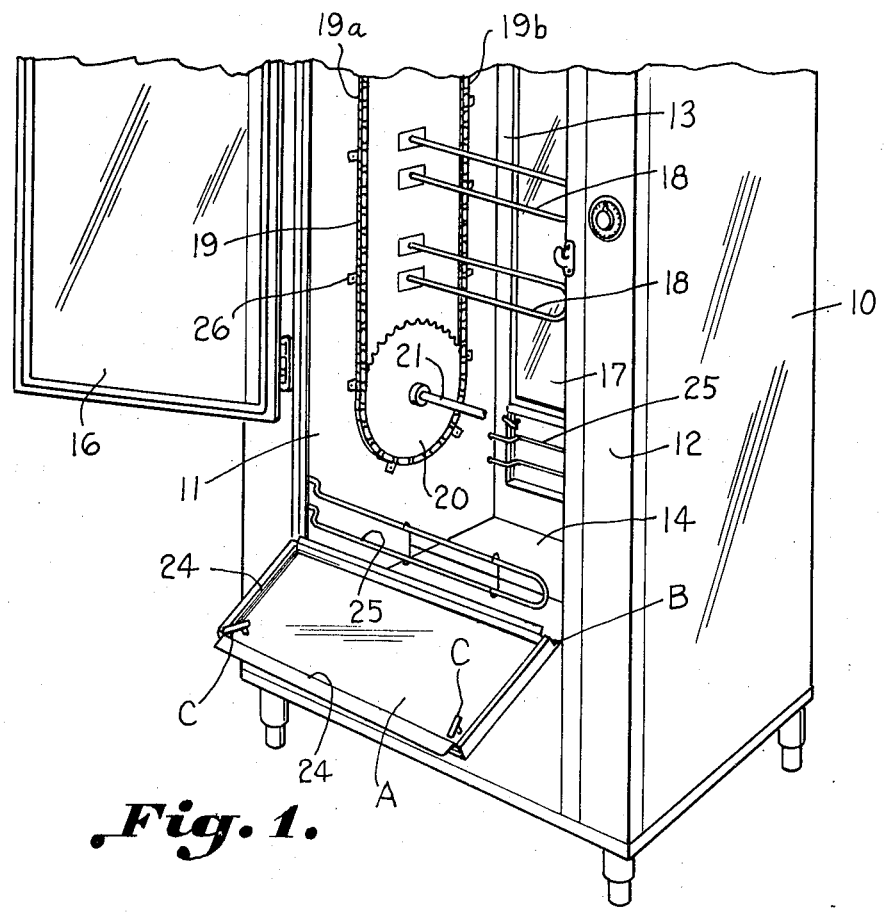
Figure 2:
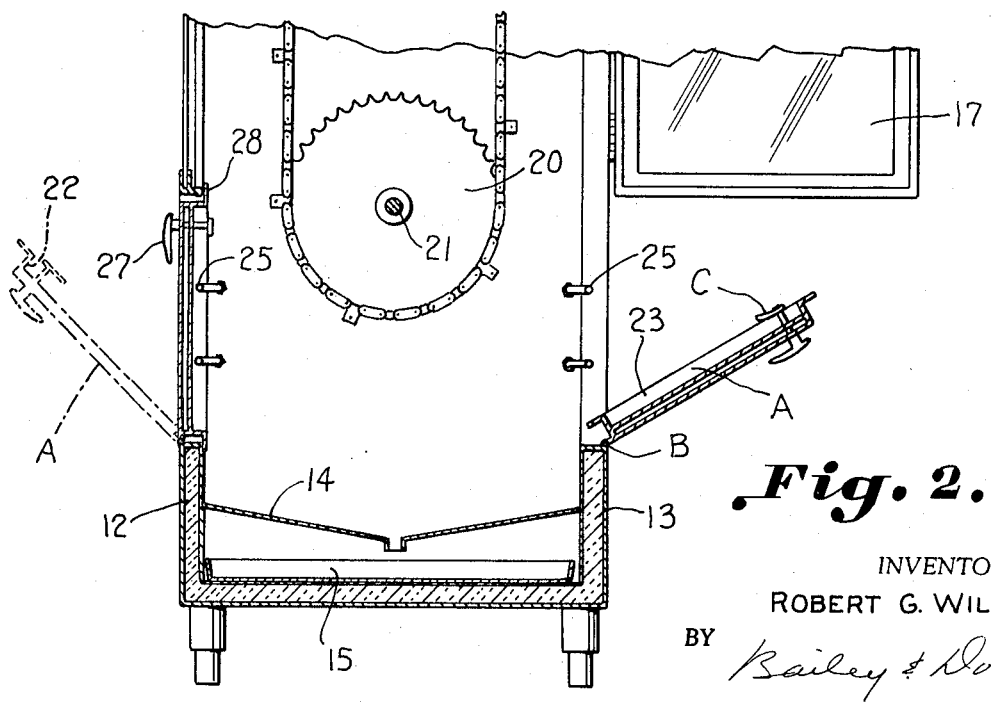

The invention will be more readily understood from a reading of the following specification and by reference to the accompanying drawing forming a part thereof, wherein an example of the invention is shown and wherein:

FIG. 1 is a perspective view illustrating an oven constructed in accordance with the present invention, and FIG. 2 is a transverse sectional elevation of the barbecue oven illustrated in FIG. 1.

The drawing illustrates a barbecue oven and the like having, an insulated substantially enclosed housing and a substantially vertical wall portion carried thereby. First electrical heating means for cooking are mounted within the housing, and a driven rotatable supporting assembly for edibles is carried within the housing adjacent the first electrical heating means. A door is carried in the housing for gaining access to the edible assembly. A recess is defined within the vertical wall portion opposite and adjacent the driven edible-supporting assembly, opening into the oven. Second electrical heating means for cooking is carried within the recess for emitting heat directly into the oven while being protected from drippings from the edibles. The vertical wall portion defining said recess includes a displaceable panel A. Means carrying said displaceable panel on one edge portion thereof on said housing is illustrated as hinge B. Means fastening said panel on said housing on another edge portion thereof includes latches C. Thus, the panel may be displaced from its vertical position for access to clean an inner surface thereof, as well as adjacent inner areas of the housing.

The barbecue oven has an insulated substantially enclosed housing which includes insulated sides 10 and 11 and carries front and rear vertical portions 12 and 13, respectively. The housing also includes a top portion (not shown) and a bottom 14 with provision for collecting drippings in a removable tray 15. Hinged glass doors 16 and 17 are provided in the front and rear walls 12 and 13, respectively. First electrical heating means for cooking are provided in the form of longitudinal heating elements 18 which are vertically spaced and centrally disposed within a rotatable supporting assembly which includes vertical runs 19a and 19b of chains 19 which are spaced adjacent each side of the oven and carried by sprockets 20 which are connected by shafts 21 at the top and the bottom.

The lower shaft 21 is driven by a suitable motor (not shown). The vertical wall portions 12 and 13 each define a recess 22 and 23, respectively, and include a displaceable panel A. The recesses 22 and 23 are defined by inturned sides 24 carried at each edge thereof. It will be noted that auxiliary heating elements 25 are accommodated within the respective recesses. The spaced chains are provided with suitable mounting means 26 for positioning edible-carrying supports, such as spits or trays (not shown) between respective opposed runs of the chains 19.

It will be observed that the displaceable panels A are carried on one edge portion thereof on the housing as by the hinges B on a lower edge thereof. Fastening means in the form of latches C are carried by the panel on an upper edge thereof, and engage the lower portion of the respective doors 16 and 17. The latches include a handle 27 which is accessible from the outside of the oven. The external handle 17 serves to turn an internal latching member 28 which engages a lower internal portion of the respective doors. It is thus observed that the latching portions 28 may be released from the lower portions of the doors permitting the displaceable panels to be swung down as illustrated in the drawing, providing free access to the inner surface thereof, as well as adjacent areas in the lower portion of the oven. If desired, the panel may be made entirely of removable and from suitable means, such as the latches C provided on both respective edge portions of the panel in lieu of the use of hinge B.

While a preferred embodiment of the invention has been described using specific terms, such description is for illustrative purposes only, and it is to be understood that changes and variations may be made without departing from the spirit or scope of the following claims.

What is claimed is:

1. In a barbecue oven and the like having, an insulated substantially enclosed housing and a substantially vertical wall portion carried thereby, first electrical heating means for cooking mounted within said housing, a driven rotatable supporting assembly for edibles carried within the housing adjacent said first electrical heating means, a door in said housing for gaining access to said edible assembly, a recess defined within said vertical wall portion opposite and adjacent said driven edible-supporting assembly, said recess opening into the oven, and second electrical heating means for cooking carried within said recess for emitting heat directly into the oven while being protected from drippings from the edibles, said vertical wall portion defining said recess including: a displaceable panel; means carrying said displaceable panel on one edge portion thereof on said housing; and means fastening said panel on said housing on another edge portion thereof; whereby said panel may be displaced from its vertical position for access to clean an inner surface thereof as well as adjacent inner areas of the housing.

2. The structure set forth in claim 1, wherein said means carrying said displaceable panel are hinges carried by a lower side edge thereof; and said fastening means are carried by an opposite side edge thereof.

3. The structure set forth in claim 1, wherein said first electrical heating means are centrally disposed within a rotatable supporting assembly between vertical runs of spaced chains; and wherein said displaceable panel is located adjacent the bottom of the housing.

* * * * *